United States Patent [19]
Waldner et al.

[11] Patent Number: 5,570,656
[45] Date of Patent: Nov. 5, 1996

[54] ANIMAL FEEDER WITH LOCKING ADJUSTABLE GATE

[75] Inventors: John S. Waldner; Kenneth Waldner, both of Huron, S. Dak.

[73] Assignee: King Systems, Incorporated, Galesburg, Ill.

[21] Appl. No.: 416,187

[22] Filed: Apr. 4, 1995

[51] Int. Cl.⁶ ............................................. A01K 5/00
[52] U.S. Cl. ................................. 119/53.5; 119/53
[58] Field of Search ....................... 119/53, 53.5, 54, 119/51.5

[56] References Cited

U.S. PATENT DOCUMENTS

| | | |
|---|---|---|
| 349,480 | 9/1886 | Chenoweth . |
| 555,909 | 3/1896 | Smith ...................... 119/53.5 |
| 1,027,881 | 5/1912 | Mills . |
| 1,061,710 | 5/1913 | Webb . |
| 1,148,301 | 7/1915 | Enos, Jr. . |
| 1,340,869 | 5/1920 | Ashley . |
| 1,546,241 | 7/1925 | Karasuda ................ 119/53.5 |
| 1,553,502 | 9/1925 | Boyes ..................... 119/53.5 |
| 2,771,058 | 11/1956 | Howard ..................... 119/78 |
| 2,919,675 | 1/1960 | Beachy . |
| 2,966,135 | 12/1960 | Kelley et al. ............ 119/53.5 |
| 2,974,634 | 3/1961 | Williams et al. . |
| 3,269,358 | 8/1966 | Hawley ................. 119/51.12 |
| 3,800,746 | 4/1974 | Stidham . |
| 4,131,082 | 12/1978 | Sollars .................... 119/51.5 |
| 4,182,273 | 1/1980 | Peterson ................. 119/51.5 |
| 4,278,049 | 7/1981 | Van Dusseldorp ...... 119/53.5 |
| 4,303,039 | 12/1981 | Thibault . |
| 4,306,518 | 12/1981 | Herring .................... 119/53.5 |
| 4,353,329 | 10/1982 | Thibault .................. 119/53.5 |
| 4,377,130 | 3/1983 | Schwieger ............... 119/51.5 |
| 4,385,591 | 5/1983 | Petersen .................. 119/53.5 |
| 4,401,057 | 8/1983 | Van Gilst ............ 119/51.11 X |
| 4,421,060 | 12/1983 | Frush et al. ............. 119/72.5 |
| 4,479,456 | 10/1984 | Schweiger ............... 119/51.5 |
| 4,481,907 | 11/1984 | Blicher ............... 119/51.5 X |
| 4,491,087 | 1/1985 | Herring, Sr. ............ 119/53.5 |
| 4,582,023 | 4/1986 | Zumbahlen et al. ..... 119/53.5 |
| 4,660,508 | 4/1987 | Kleinsasser et al. .... 119/51.5 |
| 4,790,266 | 12/1988 | Kleinsasser et al. .... 119/51.5 |
| 4,825,811 | 5/1989 | O'Kelley ................. 119/51.5 |
| 4,889,078 | 12/1989 | Smiley .................... 119/53.5 |
| 4,911,727 | 3/1990 | King ........................ 119/53 |
| 5,036,798 | 8/1991 | King ....................... 119/53.5 |
| 5,069,164 | 12/1991 | Wiwi ........................ 119/53 |
| 5,094,187 | 3/1992 | King ....................... 119/51.5 |

FOREIGN PATENT DOCUMENTS

| | | |
|---|---|---|
| 259860 | 4/1926 | Canada . |
| 280125 | 5/1928 | Canada . |
| 315789 | 10/1931 | Canada . |
| 474138 | 6/1951 | Canada . |
| 478578 | 11/1951 | Canada . |
| 521984 | 2/1956 | Canada . |
| 564817 | 10/1958 | Canada . |
| 666320 | 7/1963 | Canada . |

(List continued on next page.)

*Primary Examiner*—Robert P. Swiatek
*Attorney, Agent, or Firm*—Marshall, O'Toole, Gerstein, Murray & Borun

[57] ABSTRACT

An animal feeder having a feed trough and a feed hopper, located above the feed trough and having a discharge opening, for storing feed and dispensing feed through the hopper discharge opening to the feed trough. The animal feeder has a gate associated with the feed hopper which is movable through a range of positions to vary the size of the hopper discharge opening. The feeder is provided with a rotatable gate adjustment mechanism for changing the position of the gate and a gate support which includes a support member. The gate adjustment mechanism has a locking mechanism having an L-shaped stop member coupled to the gate adjustment mechanism. The stop member has two arms which are disposed substantially at a right angle. The stop member is pivotable between a locking position in which one of the arms of the stop member engages a slot in the gate support member to prevent rotation of the gate adjustment mechanism and a gate-adjusting position in which the stop member allows rotation of the gate adjustment mechanism for adjustment of the gate position.

23 Claims, 3 Drawing Sheets

FOREIGN PATENT DOCUMENTS

| | | |
|---|---|---|
| 865456 | 9/1973 | Canada . |
| 976048 | 10/1975 | Canada . |
| 1097995 | 3/1981 | Canada . |
| 1135578 | 11/1982 | Canada . |
| 1172923 | 2/1984 | Canada . |
| 1176122 | 10/1984 | Canada . |
| 1177706 | 11/1984 | Canada . |
| 1188579 | 6/1985 | Canada . |
| 2034830 | 9/1994 | Canada . |
| 150442 | 3/1987 | Denmark . |
| 2513072 | 3/1983 | France ................................. 119/53 |
| 2592761 | 7/1987 | France . |
| 28 43 153 | 4/1979 | Germany . |
| 32 13 954 | 7/1983 | Germany . |
| 485767 | 5/1938 | United Kingdom . |
| 812017 | 4/1959 | United Kingdom . |
| 823056 | 11/1959 | United Kingdom . |
| 2240970 | 5/1994 | United Kingdom . |
| 86/06248 | 11/1986 | WIPO . |
| 89/08388 | 9/1989 | WIPO . |

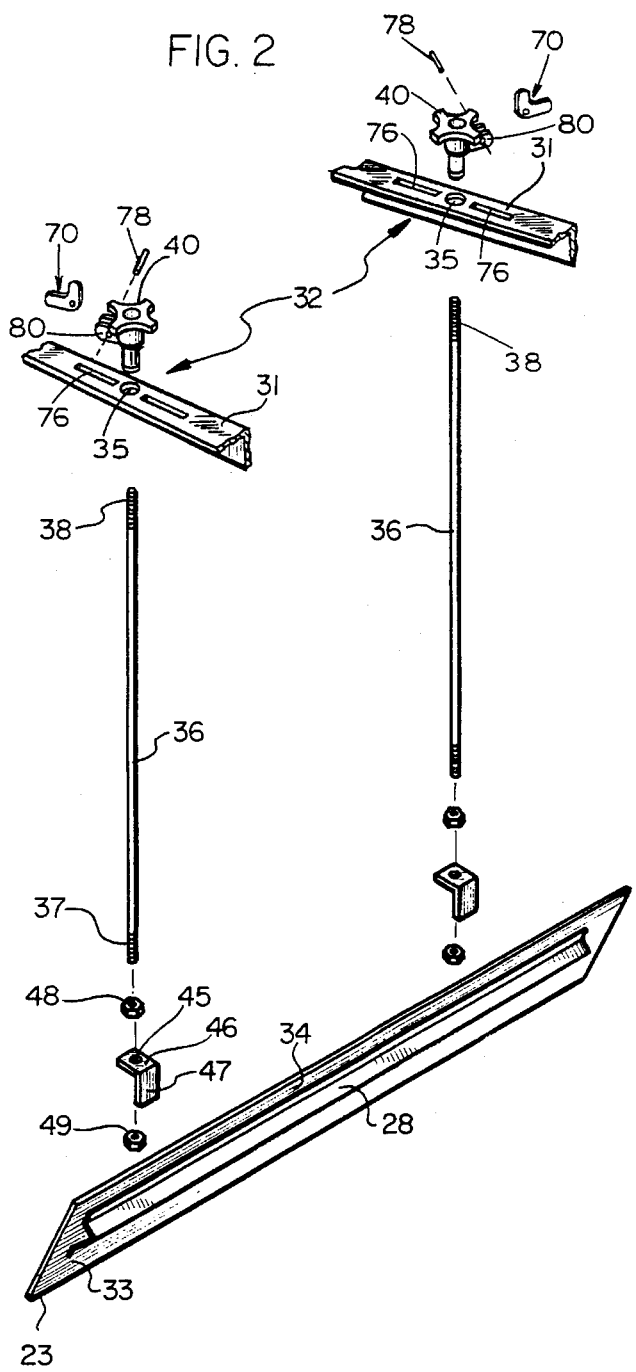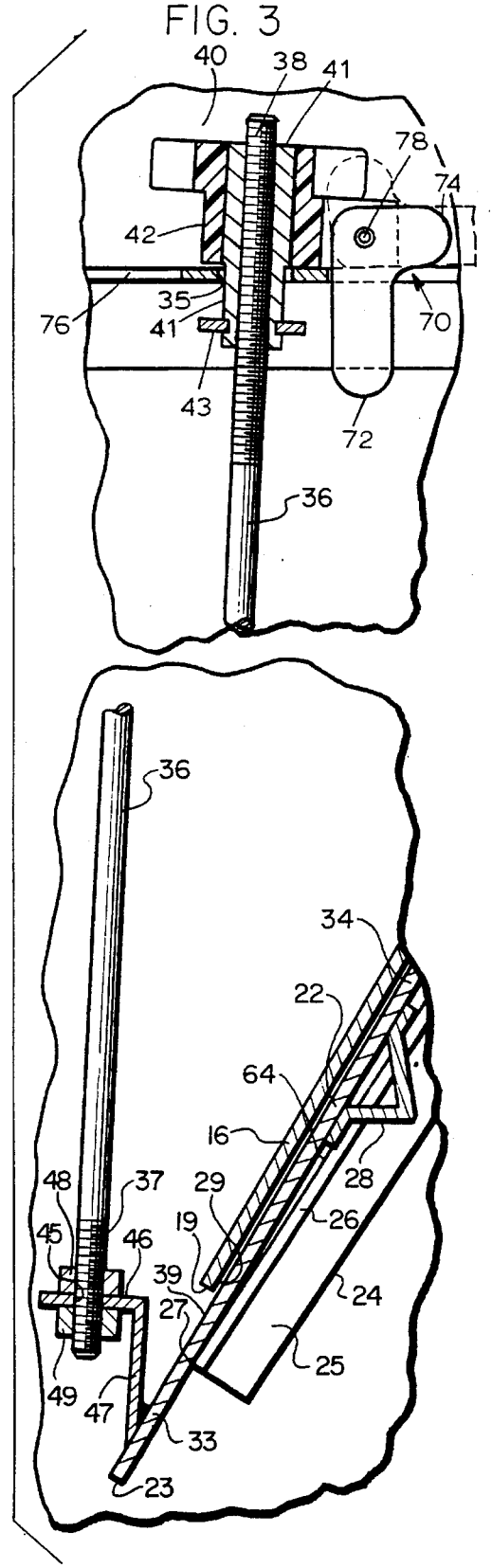

ANIMAL FEEDER WITH LOCKING ADJUSTABLE GATE

BACKGROUND OF THE INVENTION

The present invention relates generally to feeders for animals such as hogs, and more particularly to feeders of the type in which feed is dispensed from a discharge opening of a hopper onto a shelf from which the feed is swept by the animal, with its snout, into a trough located below the shelf.

One such animal feeder is described in U.S. Pat. No. 5,036,798 to Brent King. In the King feeder, the feed hopper has an inclined sidewall extending downwardly and inwardly toward the discharge opening of the feed hopper, and the shelf and the inclined hopper sidewall comprise structure cooperating to permit the animal to sweep feed from the shelf into the trough while substantially preventing the animal from feeding directly from the shelf.

The King animal feeder has a gate located at the bottom of the inclined hopper sidewall and mounted for sliding movement along the hopper sidewall in a direction having a substantial vertical component. The gate has a lower edge normally located directly above the shelf, and the vertical distance between the gate's lower edge and the shelf determines the size of the discharge opening at the bottom of the hopper. The hopper has an adjustment mechanism manually actuable to move the gate and vary the distance between the gate's lower edge and the shelf, thereby to vary the size of the hopper's bottom discharge opening.

An animal feeder may be continuously bumped and jolted by the animals during feeding. In a feeder which has a gate adjustment mechanism, the continuous bumping and jolting by the animals may cause the adjustment mechanism to become out of proper adjustment, resulting in too much or too little feed to be supplied to the animals.

SUMMARY OF THE INVENTION

The present invention is directed to an animal feeder which is provided with an adjustable feed gate which regulates the amount of feed that is dispensed to the animals and a locking mechanism that prevents inadvertent adjustment of the gate resulting from bumping or jarring of the feeder by the animals.

An animal feeder in accordance with the invention has a feed trough and a feed hopper, located above the feed trough and having a discharge opening, for storing feed and dispensing feed through the hopper discharge opening to the feed trough. The animal feeder has a gate associated with the feed hopper which is movable through a range of positions defined by a first position and a second position. The hopper discharge opening has a first size when the gate is in its first position and a second size when the gate is in its second position. The gate is provided with a rotatable gate adjustment mechanism for changing at least one of its first and second positions to adjust the range of positions through which the gate is movable. The gate is supported by a gate support mechanism which includes a support member.

The feeder has a locking mechanism, associated with the gate adjustment means, which is composed of a stop member coupled to the gate adjustment means and an opening in the gate support member. The stop member is movable between a locking position in which it prevents rotation of the gate adjustment means by engaging the opening in the gate support member and a gate-adjusting position in which the stop member allows rotation of the gate adjustment means for adjustment of the gate position.

The stop member may be provided in the form of a substantially L-shaped member which is pivotable between the locking position and the gate-adjusting position around a horizontal pivot axis. The L-shaped stop member may be pivotally supported by a rod disposed between a pair of arms fixed to and extending from the gate adjustment means.

The feeder may include a handle associated with the feed gate and engageable by the snout of an animal for allowing the animal to change the feed gate position to increase the size of the hopper discharge opening. The gate adjustment mechanism may include first and second stop members for allowing the gate adjustment mechanism to move through a hole in the gate support member only by a limited distance so that an animal can increase the size of the hopper discharge opening only by a predetermined amount by engagement of the feed gate handle. One of the arms of the L-shaped stop member may have a length at least as great as the limited distance through which the gate adjustment mechanism moves so that the L-shaped stop member will continue to engage the slot in the gate support member regardless of any movement of the gate adjustment mechanism.

The feed hopper may have a pair of sidewalls inclined at an angle and extending downwardly and inwardly towards the hopper discharge opening, and the feed gate may be mounted for sliding movement substantially at the angle at which the hopper sidewalls are inclined.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 2 is an exploded perspective view of an adjustment mechanism for a hopper gate of the feeder of FIG. 1;

FIG. 3 is an enlarged, fragmentary sectional view of the gate adjustment mechanism.

DETAILED DESCRIPTION OF A PREFERRED EMBODIMENT

Figure 1:
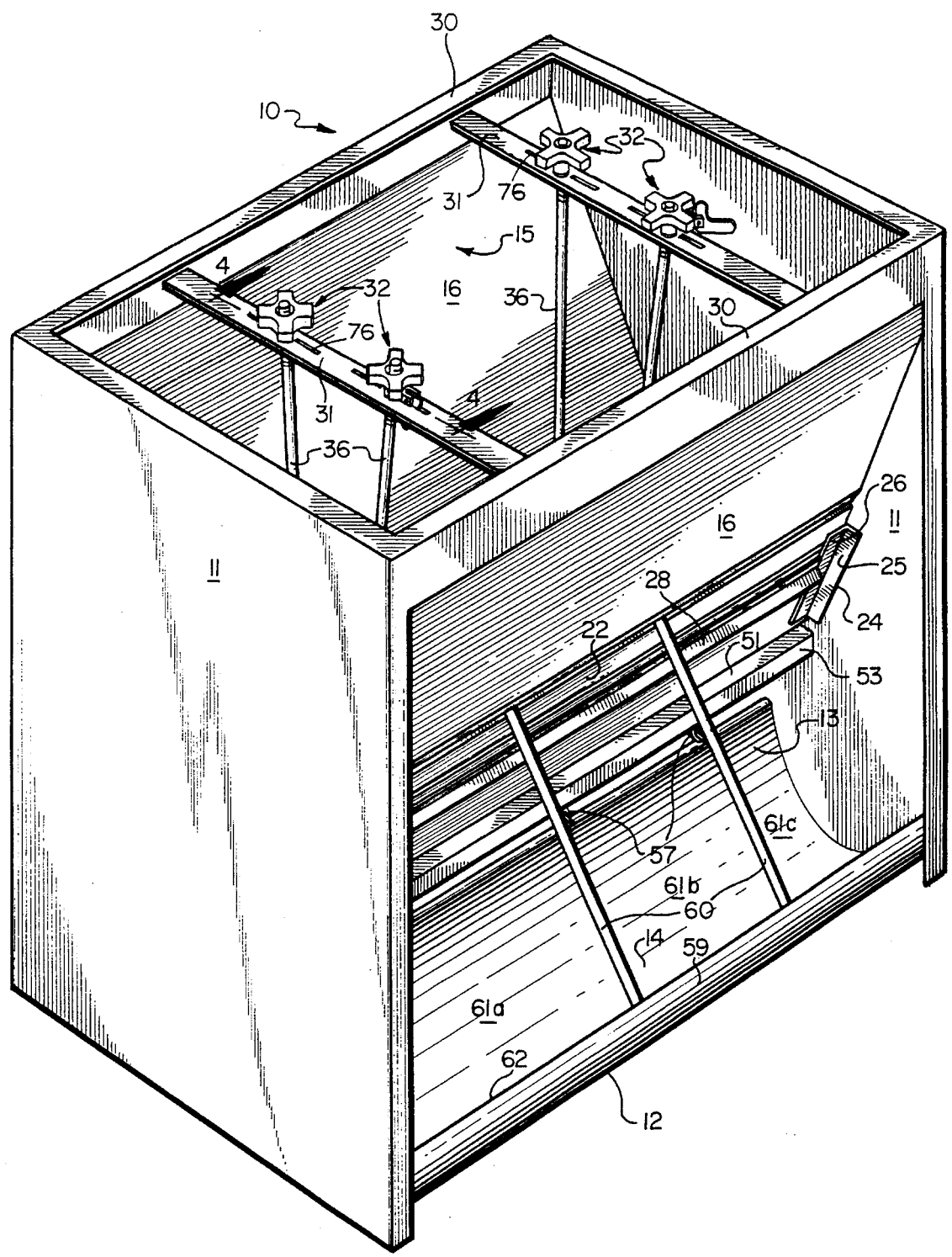
FIG. 1 is a perspective view of an embodiment of an animal feeder in accordance with the present invention.
Figure 4:
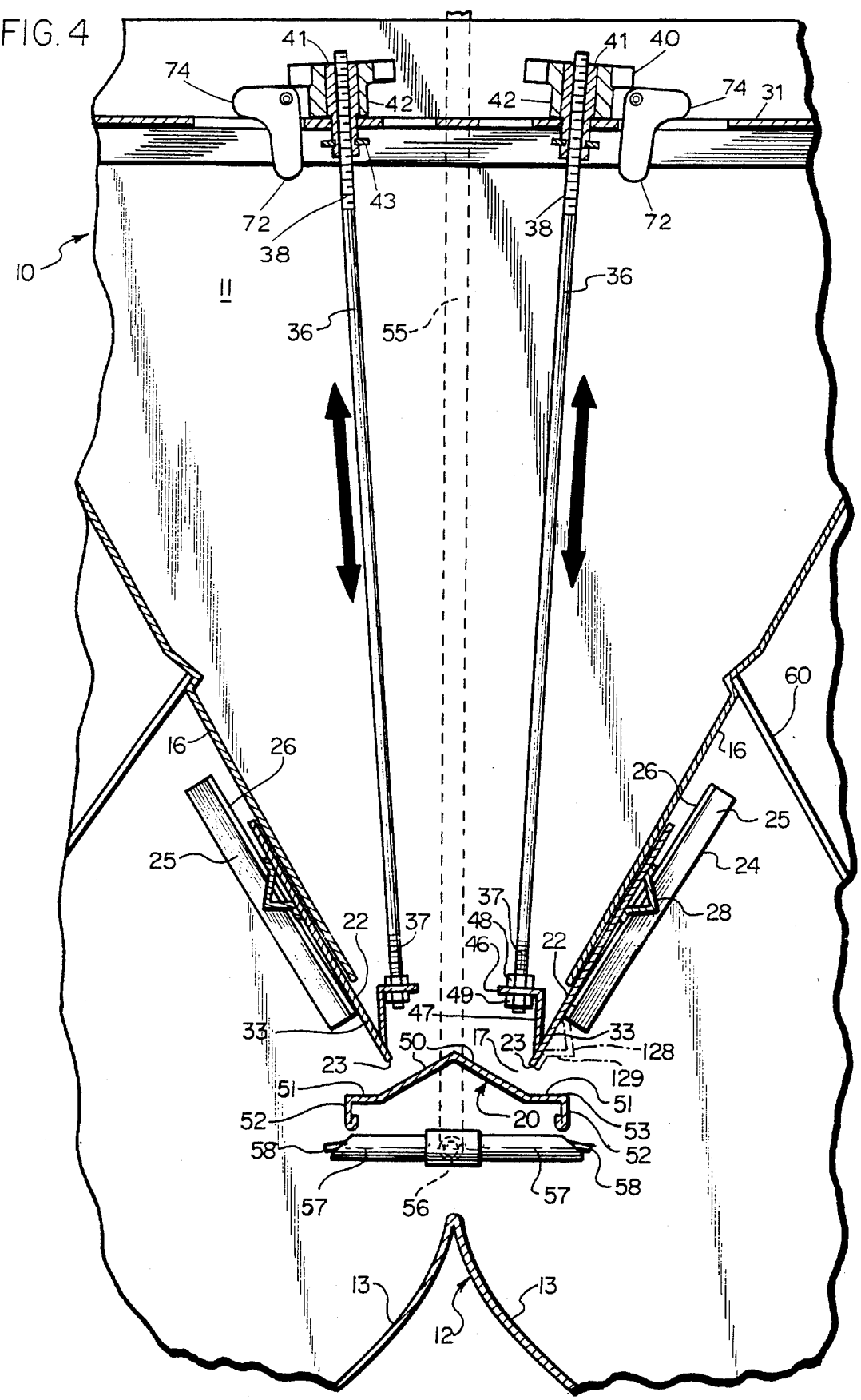
FIG. 4 is a fragmentary sectional view of a gate adjustment mechanism and associated structure.

Referring initially to FIGS. 1 and 4, indicated generally at 10 is an animal feeder comprising a pair of end walls 11, 11 between which extends a trough indicated generally at 12 and having a pair of concave portions 13, 13 each having a bottom 14. Located above trough bottom portions 14, 14 and between end walls 11, 11 is a hopper indicated generally at 15 and having a pair of mutually converging inclined sidewalls 16, 16 each extending downwardly and inwardly toward a hopper bottom discharge opening 17. Spaced below hopper bottom discharge opening 17 and above the bottom 14 of each trough portion 13 is a shelf indicated generally at 20. Hopper 15 comprises structure for storing animal feed and for dispensing the feed through hopper bottom discharge opening 17. Shelf 20 comprises structure for receiving feed dispensed from hopper 15 through discharge opening 17.

Located at the bottom of each inclined hopper sidewall 16 is a gate 22. Each gate 22 is received between the outer surface of an inclined hopper sidewall 16 and a pair of guide members 24, 24 each mounted on a respective feeder end wall 11 adjacent inclined hopper sidewall 16 and is spaced outwardly from the sidewall. Each inclined sidewall 16 and its associated pair of inclined guide members 24, 24 constitute structure mounting a gate 22 for sliding movement along sidewall 16 in the direction having a substantial vertical component. Each guide member 24 has an L-shaped cross-section comprising one flange 25 attached to an endwall 11, as by welding, and another flange 26 for engaging and guiding gate 22.

Gate 22 has a lower edge 23, and the distance between the gate's lower edge 23 and shelf 20 defines the size of the hopper's bottom discharge opening 17.

Mounted on gate 22 is a handle 28 extending between endwalls 11, 11 and engageable by the snout of an animal, such as a hog, for slidably moving gate 22 from a lower position to an upper position to increase the size of hopper bottom discharge opening 17. Gate 22 is normally urged by gravity to a lower position, and feeder 10 is provided with an adjusting mechanism, described below, for varying the lower position of gate 22 to vary the size of hopper bottom discharge opening 17.

Located at the top of feeder 10 and extending between endwalls 11, 11 are a pair of support members in the form of opposed side frame members 30, 30 each being substantially coextensive with an adjacent hopper inclined sidewall 16. Extending between side frame members 30, 30 are a pair of horizontally disposed cross members 31, 31 each located adjacent the top of hopper 15. Each cross member 31 is spaced from the other and is located between the other cross member 31 and an end wall 11. Each cross member 31 mounts a pair of adjustment mechanisms 32, 32. Each hopper gate 22 employs a pair of such couplers 32, and each of the two adjustment mechanisms 32 for a given gate 22 is mounted on a respective cross member 31. Each adjustment mechanism 32 is the same, and the following description of a single adjustment mechanism 32 is applicable to all four such couplers.

Referring now to FIGS. 2–4, each horizontally disposed cross member 31 has a hole or opening 35 through which extends a threaded upper end portion 38 of a substantially vertically disposed rod 36 having a lower end portion 37 connected to gate 22, adjacent the gate's lower edge 23, in a manner to be subsequently described. An internally threaded knob or handle 40 engages the rod's threaded upper end portion 38. Disposed around the rod's threaded upper end portion 38 is a bushing 41 extending through cross member opening 35. The handle 40, into which bushing 41 extends, has a cylindrical lower portion 42 located above cross member opening 35. Both the top end of the bushing 41 disposed inside the handle 40 and the lower handle portion 42 have a greater diameter than that of cross member opening 35. Bushing 41 has a stop member in the form of a C-shaped clamp or disk 43 removably attached to an annular recess formed in the bottom end of bushing 41 and located below cross member opening 35.

The top end of bushing 41, lower handle portion 42 and disk 43 each have a diameter and cross-sectional area greater than those of the cross member opening 35. Bushing 41 fits loosely within cross member opening 35 so that bushing 41 can slide readily up and down through opening 35 over a limited distance defined between the lower handle portion 42 (and top end of bushing 41) and the disk 43. Bushing 41 can also rock or tilt from true vertical within opening 35 without substantial impediment.

The connection between the rod's lower end portion 37 and gate 22 will now be described. The rod's lower end portion 37 is externally threaded and extends through an opening 45 in a substantially horizontally disposed flange 46 on a bracket having a substantially vertically disposed flange 47 attached to gate 22, as by welding, adjacent the gate's lower edge 23. The rod's threaded lower end portion 37 is secured to bracket flange 46 by a pair of nuts 48, 49 located respectively above and below bracket flange 46 and threadedly engaging the rod's threaded lower end portion 37.

Vertical adjustment of gate 22 is effected by rotating handle 40 which causes rod 36 to advance in an axial direction through handle 40, either upwardly or downwardly depending upon the sense in which handle 40 is rotated. The connection between rod 36 and gate 22, at 45–49, causes gate 22 to move in a direction having an upward vertical component in response to upward movement of rod 36 and in a direction having a downward vertical component in response to downward movement of rod 36. Adjustment of gate 22 in the manner described above determines the lower position of the gate, and this in turn determines the size of hopper bottom discharge opening 17, absent animal actuated movement of gate 22.

The feeder 10 has a locking mechanism to prevent inadvertent rotation of adjustment mechanism 32 caused by bumping and jarring of the feeder 10 by animals, and thus to prevent the size of hopper discharge opening 17 from being inadvertently changed. The locking mechanism includes an L-shaped stop member 70 having a first arm 72 and a second arm 74 disposed substantially at a right angle and a number of holes or slots 76 formed in cross member 31. Stop member 70 is journalled for pivoting movement about a horizontal rod 78 supported by a pair of arms 80 integrally formed with lower handle portion 42. Stop member 70 is pivotable about a horizontal pivot axis, defined by horizontal rod 78, from a locking position in which arm 72 of stop member 70 prevents rotation of adjustment mechanism 32 by engaging one of slots 76 in cross member 31 and a gate-adjusting position in which arm 72 of stop member 70 is not disposed within one of slots 76 to allow rotation of adjustment mechanism 32 for adjustment of the position of gate 22.

The length of arm 72 is preferably at least as great as the distance between the bottom surface of lower handle portion 42 and the top surface of disk 43 so that, when stop member 70 is in its locking position, arm 72 of stop member 70 will engage one of slots 76 regardless of any upward movement of bushing 41 and handle 42. Arm 74 of stop member 70, which is shown to be shorter than arm 72, is provided as a convenient way to manually pivot stop member 70 from its locking position to its gate-adjusting position.

After the hopper discharge opening 17 has been adjusted to a desired size, stop member 70 is pivoted so that arm 72 engages or is disposed within one of slots 76 in cross member 31, thus preventing further rotation of handle 40 and further adjustment in the size of hopper discharge opening 17 by adjustment mechanism 32. However, the size of hopper discharge opening 17 can be varied in response to animal actuated movement of gate 22, and this will now be described.

When the snout of an animal engages gate handle 28 from below and pushes upwardly against it, gate 22 will be urged upwardly in its slidable mounting between inclined sidewall 16 and guide members 24, 24. This in turn will cause rod 36 to be urged upwardly due to its connection to gate 22 at 45–49 (FIG. 4). As rod 36 is urged upwardly, bushing 41 moves upwardly through opening 35 in cross member 31 until the upper surface of disk 43 engages the lower surface of cross member 31 around opening 35. When that occurs, further upward movement of rod 36 and gate 22 is prevented. The gate's upper position is determined by the engagement of disk 43 with cross member 31. When the animal disengages its snout from beneath handle 28, gravity urges rod 36 and gate 22 to return from the gate's upper position to the gate's lower position.

In a typical feeder 10, the vertical distance travelled by gate lower edge 23, as gate 22 moves between its lower and upper positions, is about 0.5 in (12.5 mm).

When in its locking position, the locking mechanism prevents operation of adjustment mechanism 32 to increase the size of hopper discharge opening 17 as described above; however, even when in it is in the locking position, the locking mechanism permits the size of hopper discharge opening 17 to be increased in response to upward urging of gate 22 by the snout of an animal engaging gate handle 28.

As described more fully below, feed stored in hopper 15 flows through discharge opening 17 and accumulates on shelf 20 from where it can be swept into the trough by the snout of the animal. The animal cannot feed directly from the shelf, to any significant extent, but must sweep the feed from the shelf into trough portion 13 in order to feed. Increasing the size of the hopper's bottom discharge opening 17 increases the amount of feed which flows through opening 17, and raising and lowering gate 22 also assists in eliminating any blockage of feed flow through bottom discharge opening 17, should such a blockage occur. Opening 17 is typically manually adjusted to a size at which feed will not overflow shelf 20 when gate 22 is at its lower position but will overflow shelf 20 into trough portion 13 when gate 22 is raised to its upper position. The animal soon learns the effects it can produce by raising and lowering gate 22, and it will do so to its advantage.

The size of hopper bottom discharge opening 17 is intended to be such as to allow feed to repose on shelf 20 without falling from the shelf into a trough portion 13, absent animal actuated raising of gate 22. The maximum size to which opening 17 can be adjusted by manipulating adjustment mechanism 32 accommodates to this intent.

Not only can gate 22 be moved upwardly in response to animal actuation, but also gate 22 can be moved inwardly in response to animal actuation, and the structure which permits the latter type of animal actuated movement will now be described.

Referring to FIGS. 3 and 4, there is a spacing between the outer surface 29 of inclined hopper sidewall 16 and the inner surface 64 of flange 26 on guide member 24. The dimension of this spacing, i.e. the spacing distance, is greater than the thickness of gate 22, and this allows for play on the part of gate 22, between sidewall 16 and guide member flange 26, in a direction transverse to the direction of sliding movement of gate 22.

As shown best in FIG. 3, guide member flange 26 has a lower inner edge 27 normally located above lower edge 23 of gate 22 which has lower and upper end portions 33, 34 respectively (FIGS. 3–4). The gate's lower end portion 33 is normally urged by gravity actuated structure, to be subsequently described, against lower inner edge 27 of guide member flange 26. When an animal engages its snout against the gate's lower end portion 33 and pushes inwardly against it, the gate's lower end portion will move inwardly until the inner surface 39 of gate 22 engages the outer surface 29 of inclined sidewall 16 adjacent the sidewall's lower edge 19. The inward movement of the gate's lower end portion 33 is accommodated by rod 36 and adjustment mechanism 32 in a manner to be subsequently described. When the animal ceases pushing inwardly against gate lower end portion 33 with its snout and disengages its snout from gate lower end portion 33, gravity actuated structure to be subsequently described urges the gate to return to the outer position illustrated in FIG. 3.

The gate's lower edge 23 moves between an outer position and an inner position in response to the animal actuated movement of gate 22, described in the preceding paragraph, and returns from an inner to an outer position in response to the gravity actuated urging described in the preceding paragraph. Gate lower edge 23 is normally in contact with feed which reposes on shelf 20, and the inward and outward movement of gate lower edge 23 tends to agitate the feed which will assist in eliminating any blockage of feed flow through hopper bottom discharge opening 17.

The gravity actuated structure which normally urges the gate's lower edge 23 to its outer position will now be described with particular reference to FIGS. 3 and 4.

Rod 36 is displaced slightly from true vertical (90°), e.g. by a few degrees. More particularly, opening 35 in cross member 31 is not vertically aligned with opening 45 in bracket flange 46 but, instead, opening 35 is located further outwardly (to the right in FIGS. 3 and 4) than is bracket flange opening 45. As noted above, bushing 41 fits loosely within opening 35 and can rock therein. The displacement of rod 36 from true vertical causes a similar displacement on the part of handle 40. Because rod 36 and handle 40 are both so displaced, bushing 41 is urged into a rocked or slightly tilted position in opening 35, as shown in FIG. 3. As a result, there is localized engagement between the bottom surface of lower handle portion 42 and the top surface of cross member 31, to the right of opening 35 (as viewed in FIG. 3) but not to the left of opening 35. The localized engagement described in the previous sentence provides a pivot location for rod 36 and the rest of adjustment mechanism 32. Because the center of gravity of rod 36 is located below that pivot location, and because rod 36 is urged by gravity to pivot from its displaced disposition toward a true vertical disposition, gravity urges rod 36 and the rest of adjustment mechanism 32 in a counterclockwise sense (to the right as viewed in FIGS. 3 and 4) about the pivotal location described above. This in turn urges the rod's lower end portion 37 in an outward direction. Because the gate's lower end portion 33 and its lower edge 23 are connected to the rod's lower end portion 37 at 45–49, the gate's lower end portion 33 and its lower edge 23 are similarly urged in an outward direction (to the right as viewed in FIGS. 3 and 4).

As noted above, gate 22 can be pushed inwardly (e.g. upon engagement by an animal snout) from an outer gate position to an inner gate position. When this occurs, rod 36 and adjustment mechanism 32 are pivoted in a clockwise sense (as viewed in FIGS. 3–4) about the pivot location on cross member 31 described in the preceding paragraph. When the pushing force exerted against gate 22 is released, rod 36 and adjustment mechanism 32 are urged by gravity to pivot in a counter-clockwise sense (as viewed in FIGS. 3–4) toward the rod position illustrated in FIGS. 3 and 4, and this returns gate 22 from its inner to its outer position (FIGS. 3–4).

Referring to FIG. 4, shelf 20 has two halves each of which is the mirror image of the other half. Each half includes a downwardly inclined portion 50 integral with an outwardly extending horizontal platform 51 from which depends a vertical flange 52.

Gate 22 is, in effect an extension of hopper inclined sidewall 16. The angle of inclination of gate 22 and the spacing between platform 51 and the gate's lower end portion 33 are such that an animal is substantially prevented from directly feeding off platform 51. The relative dimensions of horizontally disposed platform 51 and vertically depending flange 52 also assist in substantially preventing the animal from directly feeding from platform 51. Instead, the animal must sweep the feed accumulating on platform 51 into trough portion 13. The factors which prevent the animal from feeding directly from platform 51 are discussed in more detail in the aforementioned related application and need not be repeated here.

In a typical feeder 10, shelf platform 50 and flange 51 may each be about 1 in. (25.4 mm) wide, for example. In such a feeder, the distance travelled by gate lower edge 23 as gate 22 moves between its inner and outer positions is, for example, about 0.25 in. (6.35 mm).

Illustrated in dash dot lines at 128 in FIG. 4 is a guard extending from gate 22 outwardly relative to inclined hopper sidewall 16 (and its extension, gate 22). Guard 128 is in the form of an outwardly extending projection mounted on gate 22 at a location closer to the gate's lower end portion 33 than to the gate's upper end portion 34. Guard 128 extends outwardly beyond an outer edge 53 of shelf 20, and the guard has a bottom part 129 located above shelf platform 51. Guard bottom part 129 has an inner end connected to gate 22 adjacent the gate's lower edge 23, and the guard's bottom part has an outer end located beyond outer edge 53 of shelf 20. Guard bottom part 129 together with shelf platform 51 defines a space into which an animal can insert its snout to sweep feed from shelf 20. In addition, bottom part 129 of guard 128 and shelf platform 51 comprise structure cooperating to substantially prevent the animal from feeding directly from shelf 20.

Moreover, guard 128 comprises structure for preventing the animal from resting its lower jaw on shelf platform 51 when the animal's snout is pointed substantially parallel to outer edge 53 of shelf 20. It is desirable to prevent the animal from doing so because, when the lower jaw is so disposed, it is possible for the animal to rotate its head in an outward direction until the upper jaw is facing outwardly and the lower jaw is facing inwardly; and when the animal's jaws are in the contorted position described in the preceding phrase of this sentence, it is sometimes possible for the animal to feed directly from the shelf, and this is undesirable. Guard 128 prevents the animal from doing so.

When the animal feeder includes guard 128, the guard can be employed as a substitute for handle 28. In such an embodiment, guard 128 can be engaged from below by the snout of an animal to effect the raising of gate 22 from its lower position to its upper position. In addition, guard 128 can also function as a handle for engagement by the snout of an animal to push the gate's lower edge portion 23 inwardly in the same manner as when the animal's snout engages the gate's lower end portion 33. Guard 128 facilitates animal actuated movement of the gate's lower edge portion in an inward direction.

Feeder 10 also includes a mechanism for dispensing water to the animal, and this is shown in FIGS. 1 and 4. Located below shelf 20 and extending parallel thereto is a feeder pipe 56. Extending outwardly from feeder pipe 56, above each trough 13, are a pair of nozzles 57, 57 each having an actuating member 58 operated by the mouth of an animal. Nozzles 57 and their operation are described in more detail in U.S. Pat. No. 4,911,727, the disclosure of which is incorporated herein by reference. Feeder pipe 56 is connected by a vertically disposed pipe 55 to a source of water (not shown).

Each trough portion 13 comprises an outer wall 59 located outwardly of the shelf's outer edge 53. Trough outer wall 59 has an upper edge 62 located at an elevation below the elevation of shelf 20. Extending angularly upwardly from (a) trough outer wall 59 to (b) hopper inclined sidewall 16 are a pair of braces 60, 60 which divide each side of feeder 10 into three sections 61a–c each for accommodating a respective animal.

In one embodiment of feeder 10, each nozzle 57 is located directly behind a brace 60. This enables each nozzle 57 to service an animal feeding at either of two adjoining sections in the group 61a–c. In addition, locating a nozzle 57 directly behind a brace 60 requires an animal to approach the nozzle from an angle rather than directly head-on, and this discourages the animal from taking excessive amounts of water and from playing with the water nozzle.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An animal feeder, comprising:

a feed trough;

a feed hopper, located above said feed trough and having a discharge opening, for storing feed and dispensing feed through said discharge opening to said feed trough;

a gate associated with said feed hopper, said gate being movable through a range of positions defined by a first position and a second position, said discharge opening having a first size when said gate is in said first position and a second size when said gate is in said second position;

rotatable gate adjustment means associated with said gate for changing at least one of said first and second positions of said gate to adjust said range of positions through which said gate is movable;

gate support means, including a support member, for supporting said gate; and locking means associated with said gate adjustment means, said locking means comprising:

a stop member coupled to said gate adjustment means; and an opening in said support member, said stop member being movable between a locking position in which said stop member prevents rotation of said gate adjustment means by engaging said opening in said support member and a gate-adjusting position in which said stop member allows rotation of said gate adjustment means for adjustment of the position of said gate.

2. An animal feeder as defined in claim 1 wherein said stop member comprises means pivotable between said locking position and said gate-adjusting position.

3. An animal feeder as defined in claim 1 wherein said stop member comprises means pivotable between said locking position and said gate-adjusting position around a horizontal pivot axis.

4. An animal feeder as defined in claim 1 wherein said stop member comprises a substantially L-shaped member pivotable between said locking position and said gate-adjusting position around a horizontal pivot axis, said L-shaped member being pivotally supported by a rod supported between a pair of arms fixed to and extending from said gate adjustment means.

5. An animal feeder as defined in claim 1 wherein said gate adjustment means comprises a knob disposed above said support member.

6. An animal feeder as defined in claim 1 wherein said support member has a hole through which said gate adjustment means passes and wherein said gate adjustment means comprises:

a knob disposed above said support member;

a bushing having a first end connected to said knob and a second end, said bushing passing through said hole in said support member; and means coupled to said bushing to prevent said second end of said bushing from passing through said hole in said support member.

7. An animal feeder as defined in claim 1 wherein said feed hopper comprises a pair of sidewalls inclined at an angle and extending downwardly and inwardly towards said discharge opening.

8. An animal feeder as defined in claim 1 additionally comprising means for mounting said gate for sliding movement in a direction having a substantial vertical component.

9. An animal feeder as defined in claim 1 additionally comprising means for mounting said gate for sliding movement substantially at said angle at which said sidewalls are inclined.

10. An animal feeder as defined in claim 1 additionally comprising means associated with said gate and engageable by the snout of an animal for allowing the animal to change the position of said gate to increase the size of said discharge opening.

11. An animal feeder as defined in claim 1 wherein said gate support means additionally comprises a rod fixed to said gate, said rod being supported by said support member and said gate adjustment means.

12. An animal feeder, comprising:

a feed trough;

a feed hopper, located above said feed trough and having a discharge opening, for storing feed and dispensing feed through said discharge opening to said feed trough;

a gate associated with said feed hopper, said gate being movable through a range of positions defined by a first position and a second position, said discharge opening having a first size when said gate is in said first position and a second size when said gate is in said second position;

rotatable gate adjustment means associated with said gate for changing said first and second positions of said gate to adjust said range of positions through which said gate is movable;

gate support means, including a support member, for supporting said gate; and locking means associated with said gate adjustment means, said locking means comprising:

a substantially L-shaped stop member coupled to said gate adjustment means and having a first arm and a second arm; and a first slot in said support member, said stop member being pivotable about a horizontal pivot axis from a locking position in which said first arm of said stop member prevents rotation of said gate adjustment means by engaging said first slot in said support member and a gate-adjusting position in which said stop member allows rotation of said gate adjustment means for adjustment of the position of said gate.

13. An animal feeder as defined in claim 12 wherein said gate adjustment means comprises a knob disposed above said support member.

14. An animal feeder as defined in claim 12 wherein said support member has a hole through which said gate adjustment means passes and wherein said gate adjustment means comprises:

a knob disposed above said support member;

a bushing having a first end connected to said knob and a second end, said bushing passing through said hole in said support member; and means coupled to said bushing to prevent said second end of said bushing from passing through said hole in said support member.

15. An animal feeder as defined in claim 14 wherein said means coupled to said bushing to prevent said second end of said bushing from passing through said hole in said support member comprises a disk removably attached to said bushing.

16. An animal feeder as defined in claim 12 wherein said feed hopper comprises a pair of sidewalls inclined at an angle and extending downwardly and inwardly towards said discharge opening.

17. An animal feeder as defined in claim 12 additionally comprising means for mounting said gate for sliding movement in a direction having a substantial vertical component.

18. An animal feeder as defined in claim 12 additionally comprising means for mounting said gate for sliding movement substantially at said angle at which said sidewalls are inclined.

19. An animal feeder as defined in claim 12 additionally comprising means associated with said gate and engageable by the snout of an animal for allowing the animal to change the position of said gate to increase the size of said discharge opening.

20. An animal feeder as defined in claim 12 wherein said locking means additionally comprises a second slot formed in said support member angularly spaced from said first slot and wherein said first arm of said stop member may engage either said first slot or said second slot to prevent rotation of said gate adjustment means.

21. An animal feeder as defined in claim 12, wherein said support member has a hole through which a portion of said gate adjustment means passes;

wherein said gate adjustment means comprises first and second stop means for allowing said gate adjustment means to move through said hole by a limited distance; and wherein said first arm of said L-shaped stop member has a length at least as great as said limited distance.

22. An animal feeder as defined in claim 12 wherein said feed trough has a bottom, additionally comprising a shelf spaced below said discharge opening of said feed hopper and above said bottom of said feed trough.

23. An animal feeder as defined in claim 12 wherein said gate support means additionally comprises a rod fixed to said gate, said rod being supported by said support member and said gate adjustment means.

* * * * *